United States Patent [19]
Babiec, Jr.

[11] 3,862,992
[45] Jan. 28, 1975

[54] PURIFICATION OF 2,4,4,4-TETRACHLOROBUTANOL

[75] Inventor: John S. Babiec, Jr., Orange, Conn.

[73] Assignee: Olin Corporation, New Haven, Conn.

[22] Filed: Aug. 20, 1973

[21] Appl. No.: 389,493

[52] U.S. Cl. .............................................. 260/633
[51] Int. Cl. ...................... C07c 31/34, C07c 29/24
[58] Field of Search ..................................... 260/633

[56] References Cited
UNITED STATES PATENTS

| | | | |
|---|---|---|---|
| 3,399,217 | 8/1968 | Zaslowsky | 260/633 |
| 3,399,241 | 8/1968 | Smith | 260/633 |

Primary Examiner—Howard T. Mars
Attorney, Agent, or Firm—F. A. Iskander; T. P. O'Day

[57] ABSTRACT

Crude 2,4,4,4-tetrachlorobutaneol is purified by a selective extraction process utilizing a water-alcohol solvent medium.

10 Claims, No Drawings

PURIFICATION OF 2,4,4,4-TETRACHLOROBUTANOL

This invention relates to the purification of 2,4,4,4-tetrachlorobutanol. More particularly, the invention relates to a simple process for ecomonically removing impurities from 2,4,4,4-tetrachlorobutanol.

The compound 2,4,4,4-tetrachlorobutanol, hereinafter referred to as TCBA, is a versatile chemical having a wide range of utility. It reacts in a manner typical of aliphatic alcohols, and its highly chlorinated nature renders it highly desirable as a component in pesticides and in various other applications which require a high chlorine content. In addition, TCBA can be readily dehydrohalogenated to give 4,4,4-trichlorobutylene oxide. This latter compound is useful in the preparation of chlorinated polyether polyols which are of great utility in the preparation of flame retardant polyurethane foam.

TCBA is generally prepared, according to the prior art, by the catalytic reaction of allyl alcohol with carbon tetrachloride. See for example U.S. Pats. No. 3,399,217 to Zaslowsky and No. 3,399,241 to Smith. Typical catalysts used in this reaction include iron powder, ferric chloride, calcium carbonate and mixtures containing one or more of these materials. Upon completion of this reaction, the used catalyst is removed and the volatile components of the reaction product are stripped off. A crude tetrachlorobutanol product is thus obtained which usually contains a substantial proportion of high boiling impurities. These impurities, which usually contain difficult-to-identify, high-molecular-weight species, do not lend themselves to being removed by simple separatory techniques. Consequently, high temperature distillation must be resorted to for purifying the crude TCBA. In addition to its relatively high cost, this purification operation is undesirable inasmuch as it could result in a partial decomposition of the alcohol product. Thus a need still exists in this particular art for a simple and economical method for the purification of TCBA.

The general utility of water and the alkanols as solvent mixtures for extracting impurities from organic compounds has been known for quite some time. See for example U.S. Pat. No. 2,891,098. However, no effective method has so far been taught or suggested by the prior art for utilizing such solvents in the purification of TCBA.

Now it has been found, in accordance with the invention, that crude TCBA containing high boiling impurities can be easily and economically purified by extraction with a select dual solvent system comprised of water and an aliphatic alcohol. Briefly, crude TCBA purification is achieved by the method which comprises
 a. dissolving crude TCBA in an aliphatic alcohol solvent,
 b. mixing with the resulting solution a sufficient amount of water to cause the mixture, upon standing, to separate into two liquid phases, namely, an upper phase containing purified TCBA and a lower phase containing high boiling impurities, and
 d. recovering the purified TCBA from the upper phase.

The method of the invention is based on a totally unexpected discovery or phenomenon. This is that the impurities in crude TCBA, although they cannot be separated by extraction with water, alcohol or certain water/alcohol mixtures, surprisingly do phase out and separate from the TCBA in a highly selective TCBA-alcohol-water system as described in detail hereinbelow.

It should be understood that the method described herein is not limited to the purification of TCBA which is the product of a particular process; nor is it limited with respect to the specific nature and/or proportion of impurities which are present in the crude TCBA. Rather, the method of the invention is contemplated for utility in purifying any impure TCBA composition, produced by any process, which contains high boiling impurities. However, in accordance with the preferred embodiments of the invention, the method described herein is particularly useful in the purification of TCBA as obtained by the reaction of allyl alcohol with carbon tetrachloride in the presence of a catalyst comprised of iron, e.g., iron powder, ferrous chloride, ferric chloride or mixtures thereof, particularly mixtures which also contain calcium carbonate. Furthermore, the method of the invention is used to maximum advantage in connection with the purification of crude TCBA as obtained by a process which comprises (a) reacting allyl alcohol with carbon tetrachloride, in the presence of a catalyst system comprising iron and calcium carbonate, to form a reaction product mixture comprised of crude TCBA, catalyst and volatile components and (b) recovering the crude TCBA from this mixture such as by filtering off and/or washing out the catalyst and stripping off the volatile components. The crude TCBA obtained usually contains up to about 25%, and more commonly about 7–20%, by weight of total impurities.

Although any aliphatic alcohol, e.g., methanol, ethanol, isopropanol, butanol and the like, may be of utility in practicing the method of the invention, optimum results obtain by using methanol which is preferred. This can be of technical or pure grade, hydrous or anhydrous, so long as it is capable of dissolving the crude TCBA. However, the use of anhydrous methanol is particularly preferred.

The alcohol may be used in any suitable proportion which is capable of dissolving the crude TCBA, such as about 3–100, and preferably about 5–50, parts per every 10 parts of pure TCBA in the crude material. In accordance with a particularly preferred embodiment of the invention, a proportion of the alcohol is used which ranges from about 10 to about 30 parts per every 10 parts by weight of pure TCBA. Conveniently mechanical agitation may be employed to aid in, or speed up, the dissolution of the crude TCBA. Also mild heat may be used if desired, although this usually is unnecessary.

Two-phase formation is achieved by mixing a critical amount of water with the alcoholic crude TCBA solution. However, it is not necessary that the crude TCBA be dissolved in the alcohol before adding the water. In other words, water may be mixed with the alcohol before, as well as after, the alcohol and crude TCBA are brought together. Thus it is to be understood that, as defined in the specification and claims herein, the step of "mixing" the requisite amount of water with the crude TCBA solution is intended to encompass for example any one of the following procedures, provided this results in at least a portion of the high boiling impurities being phased out:
 a. crude TCBA is first dissolved in alcohol and then water is added and mixed with the solution;

b. water and alcohol are first brought or blended together and then crude TCBA is mixed in;
c. water and alcohol are simultaneously added to, and mixed with, the crude TCBA; and
d. a portion of the total requisite amount of water together with the alcohol is added to the crude TCBA, the remainder of the water being added subsequently in one or more increments.

However, it is generally preferred to follow the procedure summarized in (a) above, wherein the crude TCBA is first dissolved in alcohol before the water is added and mixed with the solution.

As noted above, the proportion of water which is used is a critical feature of the invention; for it has been found that, absent an adequate proportion of water, two-phase formation would not occur or it would be incomplete and therefore unsatisfactory from a practical standpoint. On the other hand, too high a proportion of water, while it will bring about a two-phase system, will not result in the selective phasing out of the impurities from the pure TCBA, i.e., practically all of the pure TCBA as well as the impurities will be combined in the lower phase.

The requisite amount of water which is necessary to bring about a phasing out of impurities in crude TCBA varies depending on at least two and possibly three fractors which are inter-related. These are (1) the concentration of pure TCBA in the crude material, (2) the weight ratio of alcohol to pure TCBA in the alcohol-crude TCBA solution, and possibly also (3) the nature of the impurities in the crude TCBA. Accordingly, to determine the requisite amount of water for a particular alcohol-crude TCBA system, it is preferred to follow the following procedure. Water is added in small increments to the alcohol-crude TCBA solution. After each incremental addition, the mixture is stirred thoroughly and then it is allowed to stand. If two separate layers form, this signals that no more water is necessary. If no phasing occurs, then the procedure is repeated until two layers are observed. The aggregate of water increments used represents the requisite amount of water for the particular alcohol-crude TCBA system, which amount can then be used on a routine basis in subsequent purification runs using any of the procedures summarized above.

Usually such a proportion of water is used to provide a weight ratio, water : pure TCBA, in the alcohol-crude TCBA-water mixture, which is between about 1.6:1 and about 0.3:1, and preferably between about 1.3:1 and about 0.4:1. However, it is contemplated that higher as well as lower proportions of water may be used; for in accordance with the focal point of the invention, the requisite amount of water is not based on an absolute pre-conceived range, but rather it is determined in a practical manner, and on a case-by-case basis, depending on the particular nature and composition of the alcohol-crude TCBA solution which is used.

After mixing the water with the alcoholic crude TCBA solution, the mixture is allowed to stand, making way for the formation of two separate liquid phases. Usually, two-phase formation takes place within about 8-24 hours. The upper phase will usually comprise purified TCBA along with a substantial proportion of alcohol and a lesser proportion of water. The lower phase, containing the high boiling impurities, will contain water, some alcohol, and possibly small amounts of TCBA.

Recovery of purified TCBA from the two-phase system is achieved by conventional methods. Thus the TCBA phase is first withdrawn, such as by means of a separatory funnel, and thereafter the alcohol and water are removed from it by stripping preferably at subatmospheric pressure.

In many applications, complete removal of all the impurities may not be achieved by a single run as described above. In such a case, particularly where a highly pure TCBA product is desired, the extraction operation may be repeated one or more times as desired.

The method of the invention provides a very simple and highly economical means for removing high boiling, difficult-to-separate impurities from crude TCBA. The purified product is of utility in numerous applications including pesticides and plasticizers for polyvinyl chloride resins. It is also of particular utility in the production of 4,4,4-trichlorobutylene oxide. The latter compound, when reacted with a polyhydroxy compound, in turn yields a chlorinated polyether polyol which is useful in the production of flame retardant polyurethane foam.

The following examples are provided to illustrate the invention. In these examples all parts and percentages are by weight unless otherwise specified.

EXAMPLE 1

Crude TCBA was prepared by a process wherein (1) allyl alcohol was reacted with a stoichiometric excess of carbon tetrachloride in the presence of a catalyst mixture comprised or iron powder, ferric chloride and calcium carbonate, (2) the catalyst was then removed by filtration and water washing, and (3) crude TCBA was recovered by stripping off the volatile materials from the remaining reaction product mixture. A sample of the crude TCBA was analyzed by vapor phase chromatography and found to contain 82.3% of pure TCBA.

The amount of 26.26 gms. of the crude TCBA was dissolved in 50 mls. of anhydrous methanol. The resulting solution was placed in a separatory funnel and 25 mls. of distilled water were added. After shaking, the mixture was allowed to stand overnight. The upper layer was stripped of methanol and water by evaporation, yielding a product which weighed 20.43 gms. This was analyzed by vapor phase chromatography and found to contain 87.5% of pure TCBA.

COMPARISON 1

The procedure of Example 1 was repeated, except that instead of 25 mls., only 5 mls. of water were used. After shaking, the mixture was allowed to stand overnight. It was observed that no two-phase formation occurred. This comparison is provided to demonstrate the criticality of using a sufficient amount of water for bringing about two-phase formation. For this particular methanol-crude TCBA solutions, 5 mls. of water were not sufficient to cause this phenomenon to take place.

COMPARISON 2

The amount of 26 grams of distilled, highly purified TCBA was dissolved in 50 mls. of anhydrous methanol. The resulting solution was placed in a separatory funnel and 50 mls. of water were added. After shaking, the mixture was allowed to stand overnight whereupon two distinct layers formed. The lower layer was separated and stripped of all methanol and water, leaving about 26 grams of product which was found by VPC to be 100% pure TCBA. This comparison demonstrates the fact that when too high a proportion of water is used, the TCBA does not separate in the upper phase but is taken up in the lower phase.

EXAMPLE 2

A crude TCBA batch, prepared by the process summarized in Example 1, was analyzed by VPC and found to contain 85.0% of pure TCBA. To 393.7 gms. of this there were added 750 mls. of anhydrous methanol. The crude TCBA went into solution after moderate stirring at room temperature. The solution was placed in a separatory funnel and 525 mls. of distilled water were mixed in. After standing overnight, two layers were formed. The lower layer was separated, stripped of volatiles and analyzed by VPC. It had a content of 56.9% pure TCBA. The upper layer was mixed in with an additional 450 mls. of water and again allowed to stand overnight resulting in the formation of two layers. After vacuum stripping the volatile components from this upper layer, it was analyzed by VPC and found to contain 94.9% of pure TCBA.

What is claimed is:

1. A process for the purification of crude 2,4,4,4-tetrachlorobutanol containing high boiling impurities which comprises:
   a. dissolving said crude 2,4,4,4-tetrachlorobutanol in methanol, using about 3–100 parts of methanol per every 10 parts by weight of pure 2,4,4,4-tetrachlorobutanol,
   b. mixing with the resulting solution a proportion of water, ranging from about 0.3 to about 1.6 parts per every part by weight of pure 2,4,4,4-tetrachlorobutanol, which is sufficient to cause the mixture, upon standing, to separate into two liquid phases, namely, an upper phase containing purified 2,4,4,4-tetrachlorobutanol and a lower phase containing high boiling impurities, and
   c. recovering said purified 2,4,4,4-tetrachlorobutanol from said upper phase.

2. The process of claim 1 wherein said methanol is anhydrous.

3. The process of claim 1 wherein said methanol is used in a proportion of about 5–50 parts per every 10 parts by weight of said pure 2,4,4,4-tetrachlorobutanol.

4. The process of claim 3 wherein said water proportion ranges from about 0.4 to about 1.3 parts per every part by weight of said pure 2,4,4,4-tetrachlorobutanol.

5. The process of claim 4 wherein said methanol is an anhydrous.

6. The process of claim 1 wherein said crude 2,4,4,4-tetrachlorobutanol is a product of the process which comprises:
   a. reacting allyl alcohol with a stoichiometric excess of carbon tetrachloride, in the presence of a catalyst system comprised of iron and calcium carbonate, to form a reaction product mixture comprised of said crude 2,4,4,4-tetrachlorobutanol, catalyst, and volatile components,
   b. removing the catalyst and the volatile components from said reaction product mixture and recovering said crude 2,4,4,4-tetrachlorobutanol.

7. The process of claim 6 wherein said methanol is used in a proportion of about 5–50 parts per every 10 parts by weight of said pure 2,4,4,4-tetrachlorobutanol.

8. The process of claim 7 wherein from about 10 to about 30 parts of said methanol are employed per every 10 parts by weight of said pure 2,4,4,4-tetrachlorobutanol.

9. The process of claim 7 wherein said methanol is anhydrous.

10. The process of claim 9 wherein said water is employed in a proportion ranging from about 0.4 to about 1.3 parts per every one part by weight of said pure 2,4,4,4-tetrachlorobutanol.

* * * * *